Oct. 19, 1965  H. A. RAAB  3,212,433
BALING STRUCTURE AND CONTROLS THEREFOR
Original Filed April 21, 1960  7 Sheets-Sheet 1
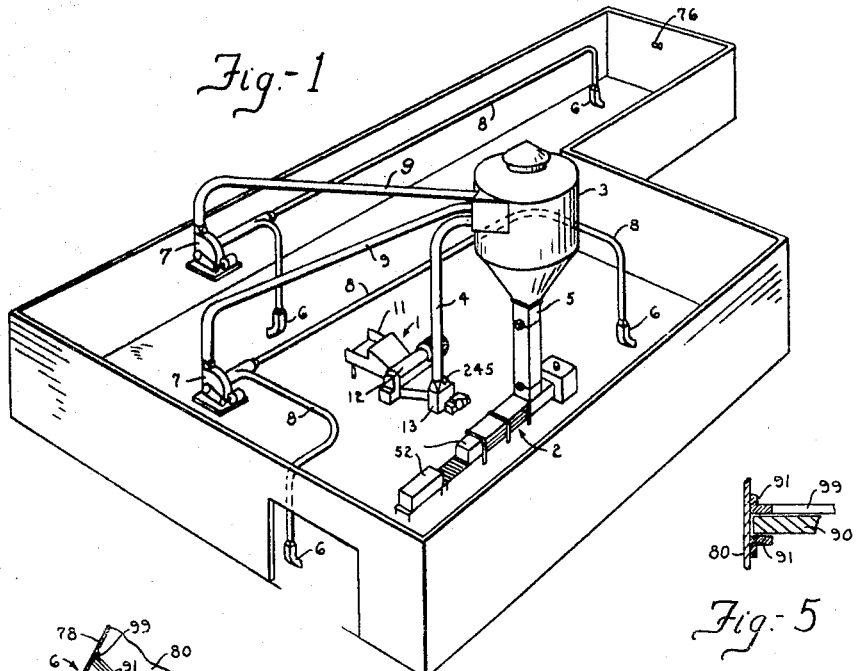
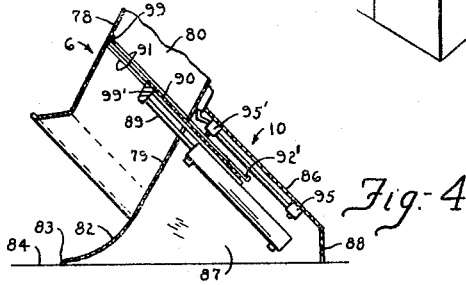
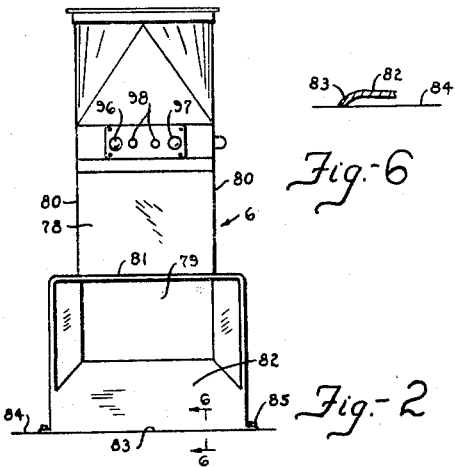
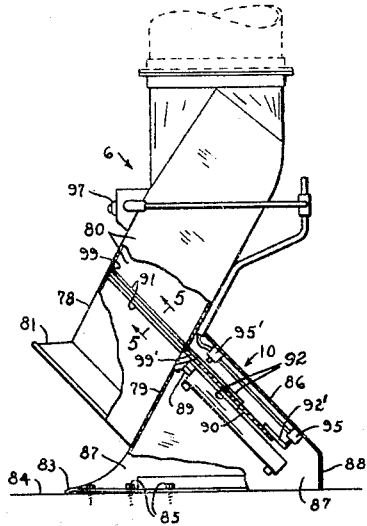
INVENTOR.
HILARY A. RAAB
BY Charles S. Penfold
ATTORNEY Oct. 19, 1965    H. A. RAAB    3,212,433
BALING STRUCTURE AND CONTROLS THEREFOR
Original Filed April 21, 1960    7 Sheets-Sheet 2

INVENTOR.
HILARY A. RAAB
BY
ATTORNEY

INVENTOR.
HILARY A. RAAB
BY
*Charles S. [signature]*
ATTORNEY

INVENTOR.
HILARY A. RAAB

United States Patent Office 3,212,433
Patented Oct. 19, 1965

3,212,433
BALING STRUCTURE AND CONTROLS THEREFOR
Hilary A. Raab, Hammond, Ind., assignor to East Chicago Machine Tool Corporation, East Chicago, Ind., a corporation of Indiana
Original application Apr. 21, 1960, Ser. No. 23,848. Divided and this application Aug. 23, 1963, Ser. No. 304,032
15 Claims. (Cl. 100—45)

The subject application is a division of my copending application Serial No. 23,848, filed April 21, 1960, now abandoned.

The subject invention relates generally to baling equipment and more particularly is directed to an apparatus or system comprising a plurality of assemblies or units which are operatively associated in a unique manner whereby to automatically form bales of uniform size and maximum density.

The equipment embodying the invention is preferably employed to bale material such as scrap paper, including, for example, box and corrugated board, newspapers, magazines, books, and the like, but may be utilized to bale any other suitable material or product.

More particularly, an object of the invention is to provide a system which, among other things, preferably comprises one or more material handling units, a baler, a collector or cyclone separator communicatively connected to the baler, suitable conduits or ducts connecting the units with the collector, exhausters operatively associated with the units for conducting the material to the collector, and controls whereby the operation of the units are synchronized with respect to one another and the baler so they are responsive to one another to provide efficient flow of the material to the collector from which it falls toward the baler through a discharge chute. If desired, different material handling units may be embodied in the system and operatively connected to one or more balers as the system may be readily modified to meet different installation requirements. One of the units preferably employed, for example, includes a pinch table feed conveyor for compressing large voluminous scrap material and force feed it to a hogger or macerator operatively associated therewith, which hogs and/or macerates the material for conduction through the conduits to the collector by an exhauster of such unit. Also, one of the units may include a hooded casing or receiver which is adapted to receive scrap or waste material of a size smaller than which is introduced to the pinch table feed conveyor. The hooded casing is provided with an exhauster having mechanism for cutting and/or shredding the material fed thereto and a valve which controls the entry or flow of the material through the casing.

A significant objective of the invention is to provide a unique system of electrical controls which may be interconnected in various combinations to achieve the results desired. More specifically in this regard, the electrical hookup is preferably such that, for example, an upper electric eye on the discharge chute connecting the collector and baler can be utilized to lock-out or prevent operation of the material handling units above referred to, so that material in excess of the capacity of the baler cannot be fed thereto. In other words, the discharge chute serves as a surge bin and the upper electric eye shuts off the flow of more material to the collector. Suitable signals are also included in the electrical hookup to indicate one or more conditions existing in the system. The motors employed in the system are all interlocked so that a control circuit must be activated at the baler.

Another object of the invention is to provide a baler embodying improved principles of design and construction. More specifically in this respect an object is to provide a baler including, among other things, a driving means in the form of a ram and novel hydraulic structure for operating or actuating the ram.

A significant object of the invention is to provide a baler with an elongate chamber for receiving the material to be compressed and impacted to form a mass or bale, including means preferably in the form of one or more relatively movable walls or members for applying radial pressure to the mass in order to retard the normal forward travel of the mass while it is in the process of being formed. The arrangement is such that pressure is also applied to a mass or bale which has previously been formed so that the latter affords a resilient movable abutment for the mass or bale being formed. In other words, the resistance offered by the formed bale is sufficient for the ram to properly and efficiently form a new bale of substantially uniform compactness.

A particular object of the invention is to provide a baler in which the elongate chamber includes a pair of side walls and a bottom wall or platform, with means for imparting relative movement to the side walls to apply pressure to the mass during its formation and movement to the bottom wall to augment the pressure exerted by the side walls.

Another important object of the invention is to provide the baler with means for determining a condition of the mass or bale so that, for example, when it attains a predetermined length or compactness, means for controlling the operation or movement of the ram is arrested to locate the ram in a forward position to maintain the completed mass under compression and so that bale ties may be inserted into slots provided in the ram head.

Also, an object of the invention is to provide a baler in which the mass compacted by each stroke of the ram is automatically held in place against the previous compacted charge of material and each succeeding charge is held at a predetermined location to form a partition which resiliently engages wall structure of the baler chamber or an internal peripheral surface to temporarily seal off that part of the chamber which initially receives the material to prevent the escape of the material as it flows into the chamber.

A further object of the invention is to provide a baler in which the bottom wall of the chamber and a top wall thereof are so designed and constructed that tearing and bending of the bale is substantially eliminated as it is being extruded from the baler chamber or tunnel.

A further object is to provide a baler with an opening which is communicatively connected to the discharge chute and the baling chamber so that when a charge of material is received from the overhead discharge chute, air will be forced outwardly through this opening. A removable filter may be placed across the opening to prevent the escape of small particles of the material from the chamber.

A specific object of the invention is to provide each of the hooded material receiving units with a valve mechanism which is designed and constructed in a manner whereby smaller scrap material may be efficiently received and conducted to the units.

A further and important object of the invention is to provide unique organization whereby the controls for the valve mechanism are operated by means for controlling the flow of material to the feed chute and/or the control of the measuring device.

Another specific objective of the invention is to provide an electrical hookup whereby only one of the hooded receiving units can be operated at a time, provided a plurality of units are hooked into one line or conduit leading to the collector.

An additional object of the invention is to provide an improved method of forming bales.

A significant object of the invention is to provide a baler comprising a frame, an elongate chamber provided with an opening adjacent one end thereof for receiving material to be compressed, means for forcibly moving the material longitudinally in the chamber to compress it as it is introduced thereto through the opening, means for applying a radial pressure to the material while it is being formed into a bale and offering resistance to its movement, and means operatively connecting said moving means and said pressure applying means in a manner whereby the latter controls the force exerted by the former.

Another object of the invention is to provide a novel filter assembly which is communicatively connected to the discharge chute and the baling chamber to permit the escape of entrapped air to the atmosphere while retaining the dust in the chamber. The location of this filter assembly is significant as it promotes the de-airiation of the flocculent mass of material in the baling chamber and particularly in the discharge chute.

A further object of the invention is to provide a baler having a chamber for receiving material to be compressed, a ram for compressing the material, means for operating the ram, and means for controlling the operation of said operating means to cause said ram to pound the material when the mass reaches a predetermined density.

Other objects reside in providing a system, machine or apparatus which offers advantages with respect to manufacture and assembly, installation, efficiency, durability, safety and low most of maintenance.

Many other objects and advantages of the invention will become apparent after the description hereinafter set forth is considered in conjunction with the drawings annexed thereto.

In the drawings:

FIGURE 1 is a schematic or perspective view illustrating the general operative relationship of the units comprising the system;

FIGURE 2 is a front elevational view of one of the material receiving units;

FIGURE 3 is a side elevational view of the unit shown in FIGURE 2, with portions in section to depict details of the structure;

FIGURE 4 is a view showing a part of the structure of FIGURE 3, with a valve constituting a component of the structure extended part way into a passage defined by such structure;

FIGURE 5 is a partial section taken substantially on line 5—5 of FIGURE 3;

FIGURE 6 is a partial section of a portion of a wall of the structure of FIGURE 2, showing in conjunction with FIGURE 3 the manner in which such portion engages a floor to prevent material being introduced from catching on such wall and sliding thereunder;

Figure 7:
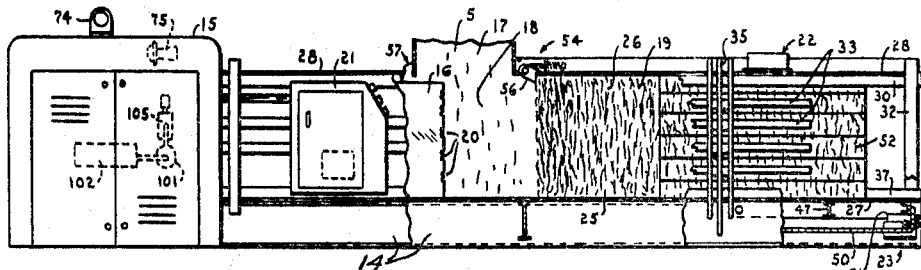
FIGURE 7 is an elevational view of the baler structure, with portions in section, including a tied bale and one in the process of being formed.

The system embodying the subject invention may be designed and constructed in various ways but as exemplified in FIGURE 1 of the drawings it includes, among other things, a material preparation and receiving unit generally designated 1, a baler 2, a collector or cyclone separator 3, a conduit or duct 4 communicatively connecting the unit with the collector, and a discharge or feed chute 5 connecting the collector with the baler. The system may include one or more additional material receiving and conveying units, each of which may comprise a receiver 6 connected to an exhauster 7 by a conduit 8 and the exhauster to the collector by a conduit or pipe 9. Otherwise expressed, one or more receiving units 6 connected to the collector through a conduit may be referred to as a sub-system. A valve mechanism generally designated 10 is preferably operatively associated with each of the receivers 6 as depicted in FIGURES 3 and 4.

The material preparation unit 1 preferably includes a pinch table feed conveyor 11, a hogger 12, and an exhauster 13. The pinch table feed conveyor compacts and advances large bulky material for feeding to the hogger at restrained speed and quantity. The hogger breaks up and macerates the material into sizes that can be efficiently conveyed to the exhauster 13 and this exhauster including the exhausters 7 serve to cut or otherwise further condition the material for transmittal to the collector. The collector receives all conveying air and the material conducted thereby and the baler which constitutes the terminus of the transported material compacts the prepared material as received into bales of uniform density. The discharge or feed chute 5 directs the flow of the material from the collector to the baler and absorbs the surges between the baler capacity and excess material delivery.

The baler 2 may be designed and constructed in various ways but as exemplified in FIGURES 7 through 17, it is made elongate and constructed from relatively strong and heavy material to provide, among other things, a base 14 and suitable framework for supporting the operating components of the baler.

One extremity of the baler is preferably constructed to provide a housing 15 for means employed to operate or move a head 16 of a ram in one end of an elongate chamber to compact the material as it is introduced to the chamber from the chute 5 through an entrance opening 17. The chamber may be referred to as including a first or baling chamber 18 in which the ram head reciprocates to pack the received material and an elongate second or bale forming chamber 19 in which the mass of material is primarily formed or shaped into a bale. The head 16 is provided with pairs of horizontal slots or grooves 20 for receiving wires or equivalent means for use in tying the bales in a conventional manner. The baler or machine is provided with suitable sensing controls located in the housing 15 for controlling the operating means for the ram means and with a cabinet 21 for additional controls, including a device generally designated 22 assisting to measure the length of a bale being formed, and an actuating or hydraulic unit designated 23, all of which will be described subsequently.

The first or baling chamber 18 is directly below the chute and is defined by a pair of opposed stationary walls 24, a bottom wall 25, the ram head and the inner end of a mass of material 26 being compressed. The forming or second chamber constitutes a continuation of the chamber 18 so that this material is compacted and moved longitudinally through the chambers.

Figure 9:
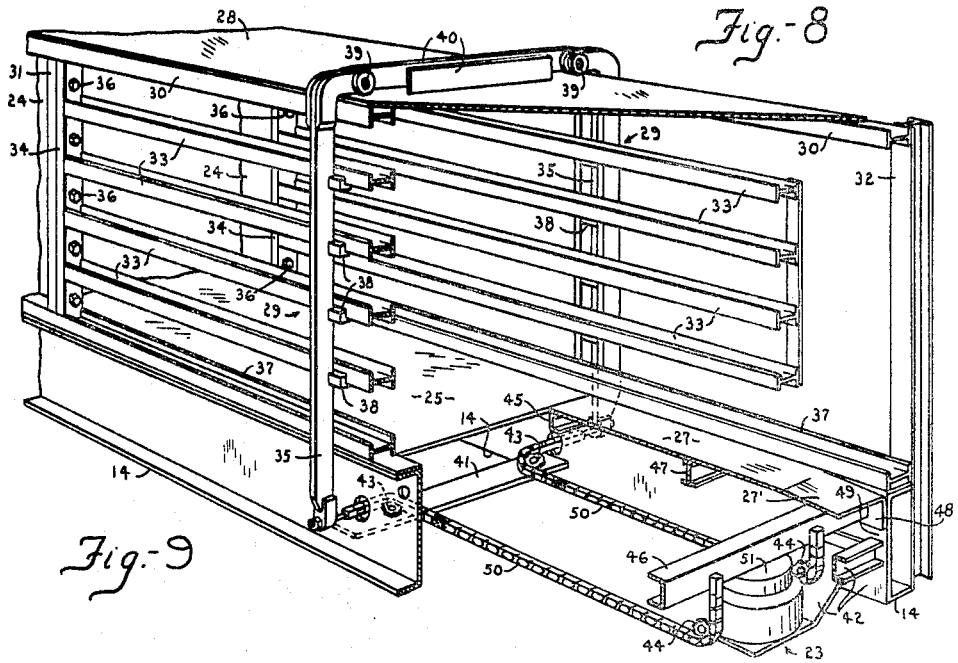
FIGURE 9 is an enlarged perspective view of part of the baler structure exemplifying certain details thereof.
Figures 10, 11:
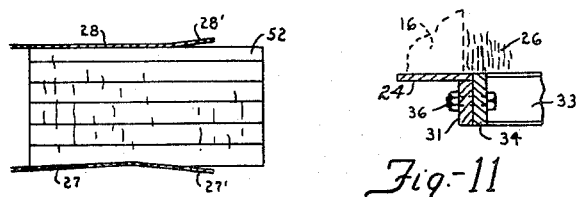
FIGURE 10 is a partial vertical section of top and bottom walls of the discharge end of the baler structure acting on a bale.
FIGURE 11 is a partial vertical section showing the manner in which a portion of a bale being formed constitutes a temporary partition which seals off a part of the baling or receiving chamber and the bale chamber.
Figure 12:
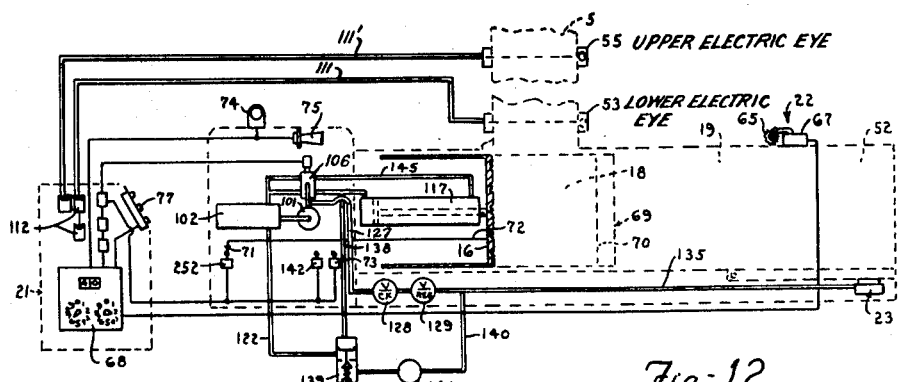
FIGURE 12 is a diagrammatic view depicting the means employed to operate the ram, including controls therefor.
Figure 17:
FIGURE 17 is a partial view of a part of the mechanism used to actuate the side wall structure of the baler through the agency of the means utilized to operate or tilt the bottom wall of the baler.
Figure 15:
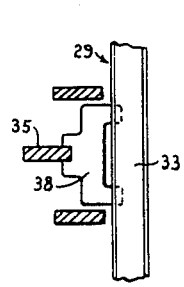
FIGURE 15 is a horizontal section taken substantially on line 15—15 of FIGURE 14.
Figure 16:
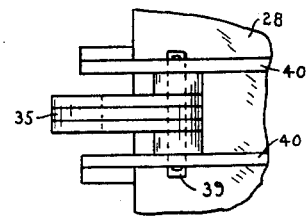
FIGURE 16 is a partial top view of the wall structure looking in the direction of the arrow 16—16 in FIGURE 14.

The forming or baling chamber is elongate and preferably includes a stationary bottom wall constituting a continuation of the bottom wall 25 of the chamber 18, a wall or tiltable platform 27 pivotally mounted at its inner end to the frame, a stationary top wall 28, and a pair of corresponding relatively movable side wall structures or units generally designated 29. The top wall 28 is supported on upper wall rails 30 carried by a plurality of pairs of pillars including pairs 31 and 32. It will be noted that the free ends of the top wall 28 and tiltable platform 27 are respectively upturned at 28' and downturned at 27' as depicted in FIGURES 9 and 10. The upturned portion 28' enables the upper portion of the bale to freely leave the top wall without tearing such portion and the downturned portion 27' is so disposed in relation to the portion 28' that the lower portion of the bale leaves the platform in advance of the upper portion to release the pressure at the upper portion and thereby provide a well shaped bale of uniform cross-section.

Each of the side wall structures is fabricated and preferably includes a plurality of four elongate horizontal resiliently flexible pressure elements or members 33 connected together in parallel relationship by a vertical end member 34 and a depending arm 35. The end members 34 are preferably anchored to the pillars 31 by bolts 36 or equivalent means and the upper ends of these members may be nested in the upper rails 30 of the frame and in a pair of lower rails 37 in order to lend stability to the structures. The pressure elements can be attached to the arm or lever 35 by any suitable means but as shown the elements are connected to rests or abutments 38 carried by the arm. These abutments are preferably in the form of yokes which distribute the pressure to the elements at spaced locations. The upper extremities of the arms are preferably inturned and respectively pivotally connected at 39 to the ends of cross-bars 40 fixed on the top wall 28 in a manner whereby each of the wall structures can be moved relatively toward or away from one another and/or flexed to apply radial pressure to the mass of material as it is being formed and moved in the chamber. The arms should normally be located no more than two-thirds of a bale length from the end of the ram stroke. This radial pressure may be varied to regulate the amount of frictional resistance derived between the mass and the side wall structures. These factors are important and as will be described more in detail subsequently, they assist in providing bales of uniform density.

Figure 14:
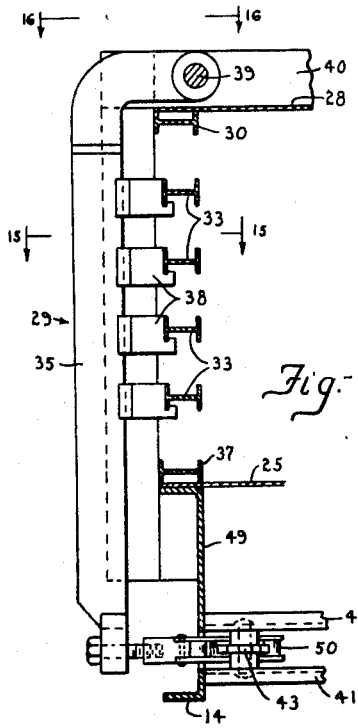
FIGURE 14 is a vertical section, primarily illustrating side wall structure of the baler.
Figure 13:
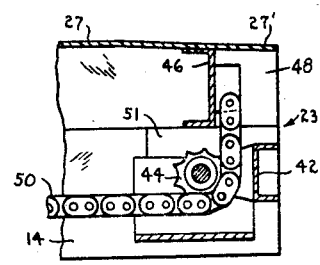
FIGURE 13 is a partial vertical section showing the means used to operate or tilt the bottom wall or platform of the baler.
Figure 18:
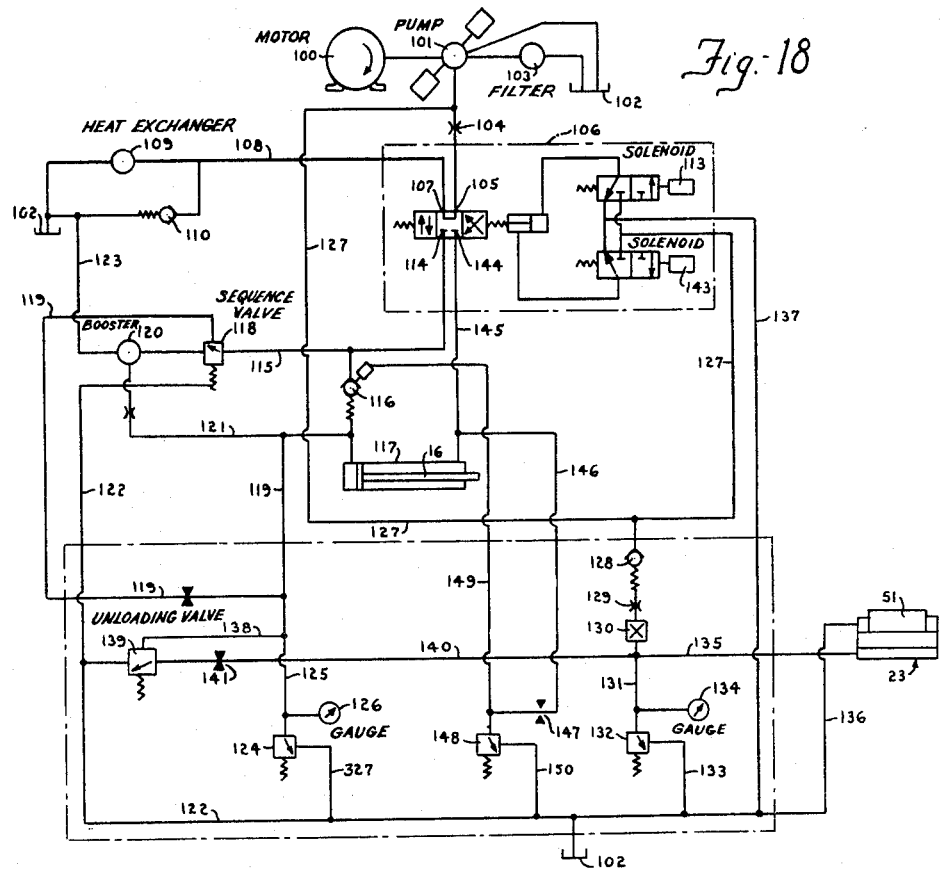
FIGURE 18 is a diagram depicting a system for controlling the means for operating the ram, including a hookup with means for controlling actuation of the bottom wall of the baler.
Figure 19:
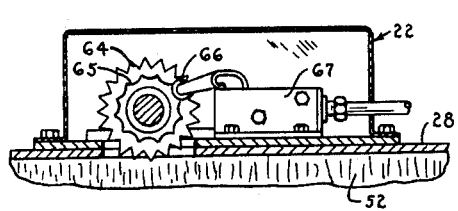
FIGURE 19 is a vertical section showing a part of a determining or measuring means in the act of engaging a bale.
Figure 21:
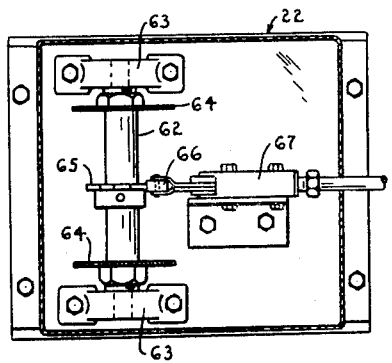
FIGURE 21 is a top view of the determining means showing other details of its structure.
Figure 20:
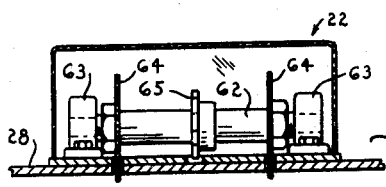
FIGURE 20 is a transverse section taken through the structure of FIGURE 19 illustrating certain details of construction.

As best illustrated in FIGURES 9, 13, and 14 the baler is provided with a pair of braces 41 below the inner extremity of the tiltable platform or wall 27 and a supporting structure 42 below its free extremity or end. A pair of sprockets 43 are mounted on the braces 41 for movement in a horizontal plane and a pair of sprockets 44 are mounted on the supporting structure 42 for movement in vertical planes.

The tiltable platform 27 is reinforced by a pair of end members 45 and 46, an intermediate member 47 and side plates 48, the latter of which are slidable between a pair of guide surfaces 49 of the base 14. A pair of chains 50 have their inner ends adjustably secured to the lower ends of the arms 35 and their outer ends anchored to the end member 46 so that the chains operatively engage the sprockets in a manner whereby when a piston 51 of the unit 23 is reciprocated the platform 27 will be caused to be raised and lowered and the side wall structures 29 to move relative to one another. The adjustable connections between the chains 50 and the arms 35 affords means for adjusting the tension of the chains and varying the distance between the wall structures to obtain the preset radial pressure on widely dissimilar materials. The side wall structures are normally disposed in a converging relation and the platform inclined upwardly so that they apply radial pressure from three directions tending to constrain, within practicable limits, the forward movement of a formed bale 52 and the mass 26 being formed. The organization is preferably such that the radial pressures applied to the formed bale and mass will create frictional resistance to resist advancement of the ram to compress the mass and move it forwardly along with the formed bale. When this occurs, the platform will be caused to tilt downwardly and the side wall structures outwardly to relieve such pressures. Provision is made for causing rapid short forward strokes of the ram after it advances to a predetermined pressure operating position in the chamber 18. With this unique organization a resultant constant baling pressure is maintained to produce bales of uniform compactness regardless of any variance in the density, frictional resistance and the weight of the material being compressed.

The density of the bale is dependent in part on the applied pressure of the ram against that part of a bale already formed and held by constriction and frictional resistance, the uniformity of the material being formed, and the completeness of each charge of material fed to the chamber 18. In this connection, an electric eye 53 designated a lower electric eye in the drawings and having a time delay relay is mounted on the feed chute 5 to insure that the chamber receives a complete charge for each stroke of the ram and a bale locking device designated 54 is mounted on the baler adjacent the chambers 18 and 19 for automatically keeping the compressed material under compression when the ram is retracted. The eye 53 controls the automatic operation of the baler so that the ram will not act unless there is sufficient material available for baling. In other words, when the material builds or stacks up in the chamber 18 and in the chute 5 to a height or level with the electric eye sensors, the eye initiates the movement of a control for the hydraulic operating means to cause the ram to move forwardly and this procedure continues as long as there is present a sufficient column of material. If the material flows to the baler at a rate faster than the baler can accommodate it, then another electric eye 55 designated an upper electric eye in the drawings and having a time delay actuated relay on the chute 5, located above the eye 53, becomes effective to render the feeder 11 inoperative and operative the valve mechanism 10 in the receivers 6 to close the latter so that no material can be introduced thereto for conveyance. The eye 55 also serves to energize visual and audible signals and if desired, valves for diverting the flow of material to various locations other than the collector 3, including other auxiliary equipment.

Figure 8:
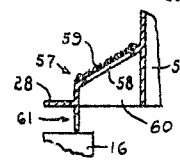
FIGURE 8 is a partial vertical section of a filter assembly which is operatively associated with the discharge chute and baling chamber.

The bale locking device 54, above referred to, includes a spring pressed pivotal lever or latch 56 which is adapted to be pivoted upwardly by each charge of material as it is compressed forwardly by the ram and then springs back to a normal operative position to engage and hold the compacted mass in place as the ram is retracted. This mass is preferably held at a predetermined location with its rear portion disposed between the upright end members 34 of the side wall structures and adjacent portions of the walls 24, 25 and 28 in order to seal off the chamber 18 from the chamber 19. Otherwise expressed, these walls define an internal peripheral imperforate bearing surface which is intimately engaged by the mass for sealing purposes. As the material travels down the chute, a certain amount of air is entrained in the chamber 18. When the ram advances, it valves off the chute and material collects above it and when reversed a void, the size of the ram head is left for the material to enter. The material falls as a column compressing the air in the void or chamber 18 and since the baler is substantially dust tight, the material falls slowly as the air is dissipated. In order to assist in this decompression, an assembly designated 58, as shown in FIGURES 7 and 8 is located for communicative connection with the chute 5 and the chamber 18. This assembly is provided with an aperture 58 through which the air can escape and a detachable dust filter 59 is disposed across the aperture which allows the material to fall freely, yet contain the dust. The top wall 28 of the baler is provided with an opening 60 through which the air can enter the filter assembly. The top wall 28 is also provided with a depending flange 61 disposed in close relation to the upper surface of the ram head to wipe off material on the head into the chamber and assist in blocking off the escape of dust laden air therefrom. Attention is directed to the fact that the latch 56 projects through an aperture therefor in the top wall 28 and this aperture is a size to closely receive the latch and thereby substantially prevent the escape of dust from the chamber.

As alluded to above, the device 22 assists in automatically measuring the length of a bale being formed in order to eliminate the human error and other influences. As explained in FIGURES 12 and 19 through 21, this device is operatively connected to an automatic electrical counter 68, and an electrical control circuit illustrated in FIGURES 22, 23 and 24.

The device 22 is preferably located on the top wall of the baler and includes an arbor 62 mounted in bearings 63 therefor. A pair of serrated discs 64 and a toothed cam 65 are fixed on the arbor. A trip arm 66 of a limit switch 67 is actuated by the cam 65. The discs are mounted to extend through slots provided therefor in the top wall to imbed into the bale 52. The slots are preferably of a size to closely receive the discs in order to substantially prevent the escape of dust into a box containing the device. As the bale advances, the discs rotate and cause the arbor to rotate the cam 65. As the high point of each tooth on the cam passes under a roller on the trip arm 66, an electrical contact is made which causes an electrical impulse to be received by the electrical counter 68 so that the linear motion of the bale is counted. The teeth of the cam are circumferentially spaced so that each space may represent a distance of approximately one inch that the bale travels. This spacing may obviously be modified. By presetting the counter 68, a given distance can be counted and when the predetermined number of counts has been reached an electrical impulse is delivered to the control circuit to cause the hydraulic operating means for the ram to move the ram head to a predetermined fixed forward position at rest, as indicated at 69, which position is in advance of its normal operating stroke as indicated at 70 so that the slots 20 in the head are exposed in order that the bale ties can be readily inserted into the slots through the five spaces between the pressure elements 33 and the rails 30 and 37.

When the ram is in the forward fixed position 69, a dog 71 on a rod 72 carried by the ram trips a switch 73 to establish an electrical circuit that is utilized for operating a visual signal 74, an audible signal 75 on the baler, and a signal 76 which may be located at a desirable remote area to notify the operator the condition of the baler. Also, this circuit can operate any auxiliary equipment desired. The ram operating means cannot function until a manual control button 77 is actuated to energize a control circuit to reactivate said operating means so that ram will again operate normally.

As alluded to above, each of the receiver units 6 is provided with a valve mechanism 10. These units may be constructed in various ways but as depicted in FIGURES 2 through 5, each unit preferably includes an elongate tubular casing having a front wall 78, a rear wall 79, and side walls 80. The structure is preferably supported to locate the casing in the upright inclined position shown. The front and side walls are preferably flanged to provide a hood 81 and the rear wall is formed with a curved continuation 82 having a downturned edge 83, as best shown in FIGURE 6, to intimately engage a floor 84 when fasteners 85 are extended through ears or portions of the structure into the floor in order to assist in piloting the scrap into the receiver without catching on such edge. The hood assists in receiving the material and also serves as a guard to fence an operator away from the entrance.

A housing is connected to the casing and includes an inclined top wall 86, side walls 87 and a rear wall 88. The rear wall 79 of the casing forms a partition between the casing and housing. This partition is provided with a clearance opening and a slot through which a piston rod 89 and a valve plate 90 respectively reciprocate. The plate is guided by a pair of guide means 91 provided on the inner surfaces of the side walls of the casing and by a pair of similar guide means 92 provided on the inner surfaces of the side walls of the housing. The guide means are aligned and when the plate is fully retracted it is supported on the guide means 92 and when fully extended rests on the guide means 91. The piston rod 89 is reciprocated by air in a cylinder mounted in the housing and an abutment 92' carried by the plate 90 is adapted to alternately engage a pair of limit switches 95 and 95' which control the flow of air in the cylinder and define the reciprocatory range of the valve. When, for example, a button 96 is manually operated the valve will be caused to slide rearwardly into the housing as shown in FIGURE 3 to permit material to flow through the casing, and when a button 97 is depressed the valve will slide forwardly and close off the casing as depicted in FIGURE 5. A pair of signals 98 are electrically connected with the buttons 96 and 97 to indicate when the valve is open or closed. As depicted in FIGURE 5, the front wall of the casing is preferably provided with a member 99 which serves as an abutment or lip for engaging the fore edge portion of the valve to seal and brace it against the extreme pressure created by the exhauster. The electrical controls at each receiver are operatively connected with the electric eye circuit to place the operation of the valve under the control of the eye 55.

It will be noted that a fitting 99' connecting the rod and valve serves to seal off the clearance opening in the rear wall 79 of the casing when the valve is fully retracted.

Attention is directed to the fact that the slide valve is arranged for movement in a plane which is disposed at an oblique angle to the longitudinal axis of the casing. When the valve is closed while material is being introduced, air flowing along the rear wall 79 is interrupted, breaking the normal flow of suction at the entrance to the casing. As the opening to flow is decreased, the air velocity is decreased preventing the normal flow of material, yet maintaining sufficient flow to efficiently conduct the material already introduced in the system. Of further significance is the fact that the speed of the closing of the valve can be preset to provide a sufficient time lag to maintain a sufficient transporting velocity and volume to clean out the line before the valve is fully closed. Also, the oblique position of the valve, as related to the other components of the structure, offers a setup whereby less pressure is required to operate the valve, as distinguished from conventional valves and operating means therefor. Moreover, the organization stabilizes the movement of the valve and thereby eliminates valve slamming.

The hydraulic system will now be described. The purpose of this system or circuit is to provide fluid power to a compression ram with sufficient thrust and at such speed as to develop the desired results for the baling operation.

A motor 100 drives a vane type pump 101 which sucks fluid from a storage tank 102 or reservoir then through a filter 103. Fluid passing through a pump 101 is delivered to a pipe or line connected to a volume control valve 104 and on to an open port 105 of a four way valve 106. The fluid is expelled through port 107, then flows through a line 108 to a heat exchanger 109 and back to a storage tank or reservoir 102. If the volume of fluid being pumped is greater than the capacity of the heat exchanger 109, the excess fluid which develops a pressure in line 108 greater than the spring setting of check valve 110 opens check valve 110 and bypasses to storage tank or reservoir 102.

When the light beam of the electric eye 53 is broken, a conductor within a conduit 111 carries a signal to a series of relays 112 in the control cabinet 21 which actuate a solenoid 113 of the valve 106 causing the valve to shift so that the fluid will be forced by the pump through a port 114 of valve 106 and a line 115. The fluid flows from line 115 through a check valve 116 to the cap end of a cylinder 117, which operates the ram 16 forward. When pressure builds up in the line 115 against a valve 118 and in cylinder 117, fluid will flow through a pilot line 119 to open the valve 118. Fluid then flows through a valve 118 and through a pulsating booster 120 and a line 121. The booster in combination with the driving or power means develops high impact pressures creating rapid interrupted strokes to the ram during at least a portion of its travel in one direction. The power means for transmitting power to the ram may be any means suitable for the purpose. More particularly it may be of a conventional character which includes a booster, such as, for example, the Pressure Booster of the type described in a Bulletin No. 35.2 published by "Racine Hydraulics & Machinery Inc." Racine, Wisconsin.

A drain line 122 returns pilot line fluid from valve 118 to storage tank 102. A drain line 123 operatively connects the booster to the storage tank. A relief valve 124 is connected by a line 125 to line 119 as a safety factor to maintain a predetermined maximum pressure in the cylinder 117, such pressure being indicated on a gage 126. A drain line 327 connects the valve 124 with the storage tank.

Pressure in the system also causes fluid to flow through a line 127 operatively connected to a check valve 128, and to a valve 106. Fluid will flow from check valve 128 through a metering valve 129, and a shut-off valve 130. The fluid flows from the shut-off valve 130 through a line 131 to a relief valve 132 and a drain line 133 connects this valve with the tank 102. A pressure gage 134 indicates pressure in the line 131, and such pressure forces fluid to flow through a line 135 to the hydraulic unit 23 to effect movement of piston 51 thereby raising the tiltable platform 27 and relative movement of the side wall structures 29. A drain line 136 connects the unit 23 with the tank. A drain line 137 connects the valve 106 with the tank and a pilot line 138 connects the line 125 with an adjustable unloading valve 139.

The arrangement is preferably such that if frictional resistance on the bale 52 and the mass 26 as developed by the constricting movement of the side wall structures 29 and platform 27 exceeds the desired baling pressure as preset by the valve 139, such pressure will be relieved by fluid flow through a line 140, through a metering valve 141 which has a flow rate proportional to the flow through the valve 129, and the unloading valve 139 and back to storage tank through line 122. The organization is considered to be unique and constitutes a meritorious advance in the art of baling and hydraulic and electric circuitry.

When the ram 16 reaches its normal forward operating position as indicated by the dotted line 70, the dog 71 fixed on the rod 72 actuates a switch 142 to energize through a conductor a series of relays in the control cabinet 21 which actuate a solenoid 143 of valve 106 causing the valve to shift so that the fluid will be forced by the pump through a port 144 of valve 106, and through a line 145 to the rod end of the cylinder 117 which retracts the ram 16. A pilot line 146 connects the line 145 with an orifice valve 147 and this valve is connected by a conductor to a preset relief valve 148 which governs pilot line pressure available to the check valve 116 through a line 149 so that this valve will open relieving the pressure at the cap end of the cylinder 117. A drain line 150 connects the relief valve 148 with the tank 102.

Figure 22:
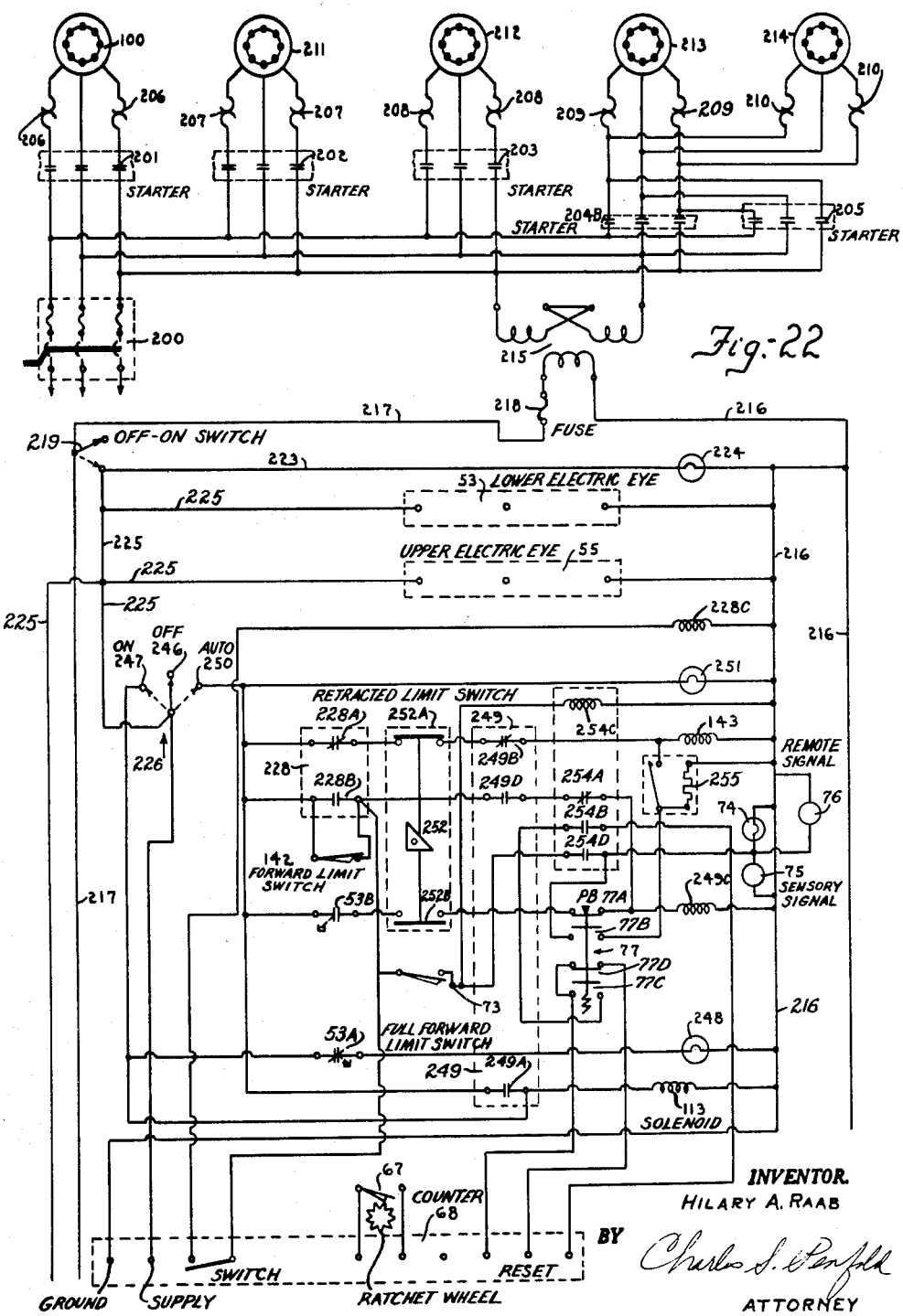
FIGURES 22, 23, and 23 exemplify the wiring system.
Figure 23:
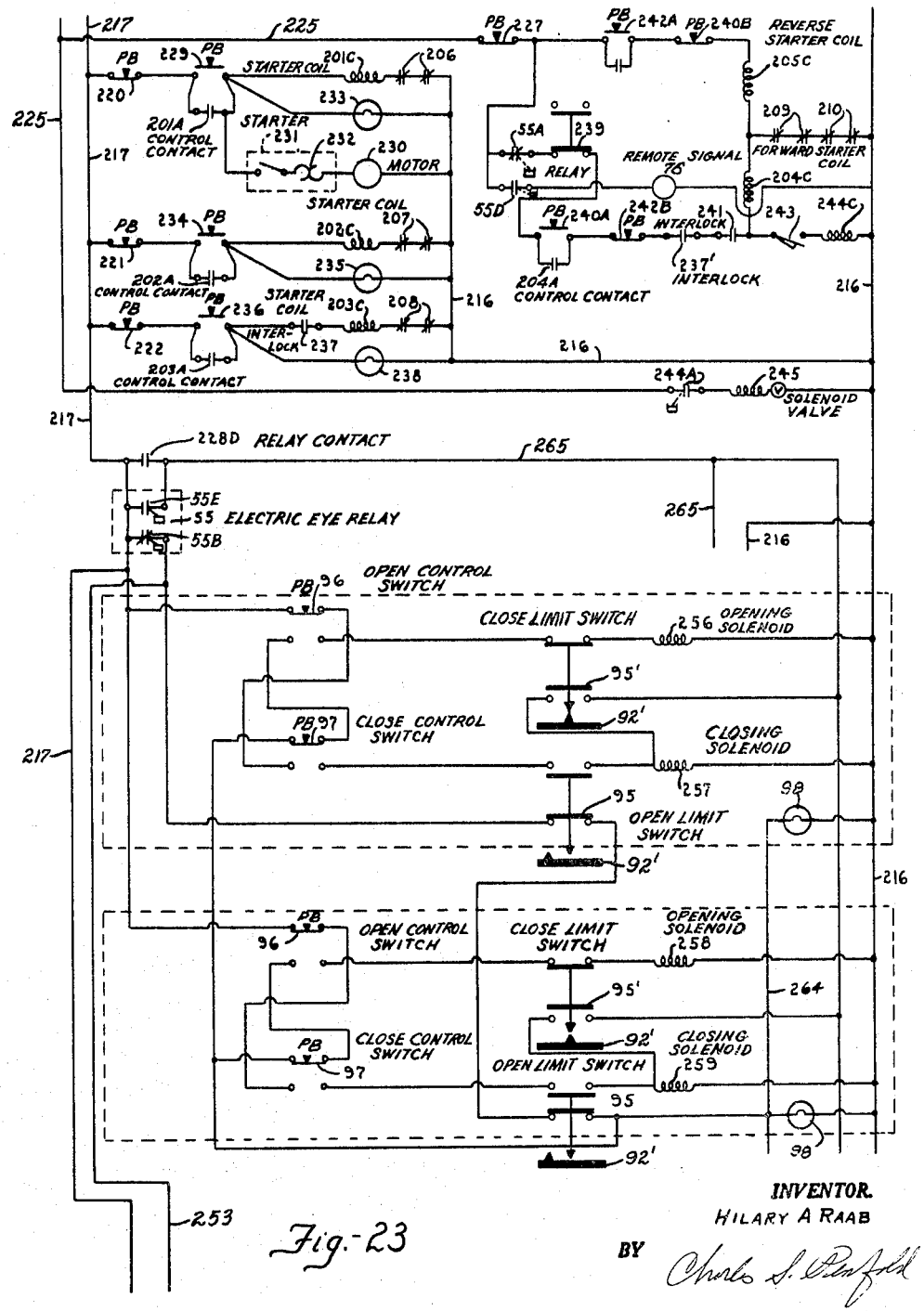
Figure 24:
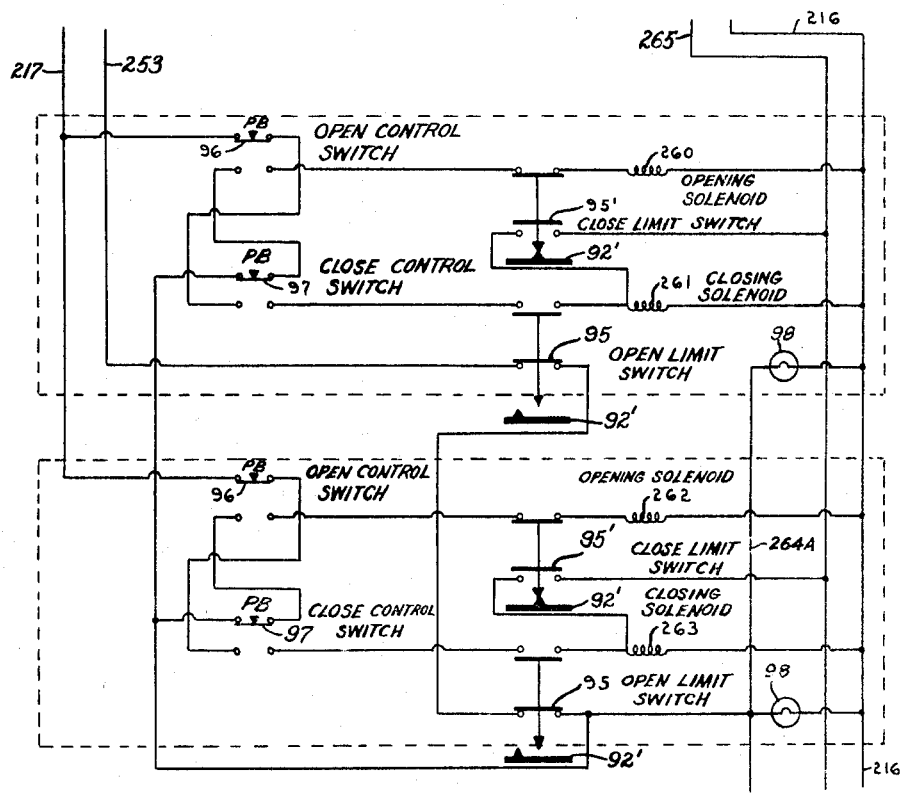

The electrical system or circuits, as exemplified in FIGURES 22, 23, and 24, will now be described. The purpose of this circuit is to provide primary electrical power to all motors herein connected and reduced voltage power for the control circuit. The control circuit is so interconnected as to provide the sequence of operations necessary for the equipment to function as one integrated unit.

Primary power, supplied by the purchaser, is connected to a circuit breaker 200 and then to motor starters 201, 202, 203, 204, and 205. Two of three conductors for each motor connect to overloads correspondingly designated 206, 207, 208, 209, and 210. Third conductors respectively connect the aforesaid motor starters with corresponding motors identified as follows: baler 100, exhauster 211, hogger 212, feed conveyor 213, and pinch conveyor 214.

A two conductor connection is made on the downstream side of the circuit breaker 200 to a reducing voltage transformer 215 which provides reduced-voltage power for all controls hereinafter set forth. A conductor 216 from the low voltage side of the transformer may be considered a common conductor. Another conductor 217 passes through a fuse 218 and connects to the upstream side of all controls while conductors downstream from the controls generally connect with the common conductor 216.

The conductor 217 from the fuse 218 connects to switches 219, 220, 221, and 222. When the switch 219 is closed, current is conducted to the entire control circuit. All relays are shown in their normal conditions prior to energization. The symbols PB appearing in the electrical circuitry designate push-button switches. Specifically, current is conducted through a conductor 223 to an indicating light 224 and then to conductor 216. Current also flows through a conductor 225, through the lower electric eye 53 and to conductor 216, through the upper electric eye 55 to conductor 216, to a switch 226, a switch 227, and a time delay relay 244A and to a counter 68 containing a relay 228.

The motors 211 through 214 are interlocked for starting in proper sequence. A switch 229 may be closed at any time to start the motor 100 of the baler 2, shown in FIGURE 1, by allowing current to flow through the magnetic motor starter 201, as shown in FIGURE 23, through a coil 201C of its overloads 206 and thence to 216. When the switch 229 is manually closed, the coil 201C is energized to close an auxiliary control contact 201A whereby to seal the circuit when the switch 229 is manually released. When this starter is energized, current flows to a motor 230, through its starter 231, thence to 216, and to light 233 to 216.

A switch PB 234 may be closed at any time to start a motor 211 of the exhauster 13 by allowing current to flow through a coil 202C of the starter 202, overloads 207 to conductor 216, and from the switch to light 235 and conductor 216. The coil 202C closes an auxiliary control contact 202A of the magnetic motor starter 202 to seal the circuit when the switch 234 is opened and also closes auxiliary control contacts 237 and 237' of starter 202. The control contacts constitute interlocks.

A switch 236 may be closed after switch 234 has been actuated, closing control contact 202A which starts the motor 212 of the hogger 12 by allowing current to flow through an interlock 237, a coil 203C of starter 203, its overloads 208, conductor 216, and from switch 236 to light 238 and 216. When the switch 236 is manually closed coil 203C is energized colsing an auxiliary control contact 203A of magnetic starter 203. Also, when coil 203C is energized another auxiliary control contact 241 of the starter 203 is closed to constitute an interlock. When switch 236 is opened a sealing circuit is produced through the control contact 203A.

Current from the switch 227 flows through a contact 55A of the electric eye relay 55, switch 239 to switch 240A. Closing the switch 240A allows current to flow through a switch 242B, interlocks 237' and 241, a coil 204C of a reversible starter 204, overloads 209 and 210 and conductor 216. When the switch 240A is manually closed a coil 204C is energized an auxiliary control contact 204A is closed to seal the circuit when the switch 240A is manually released. This arrangement starts motors 213 and 214 of conveyor 11 to drive the conveyor belts forwardly. Operation of a switch 242A will allow current to flow through a switch 240B, a coil 205C of starter 205, overloads 209 and 210, conductor 216 to drive the conveyor belts rearwardly.

A switch 243 is operated by the vertical movement of the pinch conveyor of the pinch table feed conveyor to control the flow of current to the coil 244C of a relay 244 to conductor 216. Current flows through a conductor 225 to a contact 244A of the time delay relay 244 to a destatizing valve solenoid 245 and conductor 216. This valve controls a fluid spray to the air conveyor system to ground out the electrostatic charge developed as a result of hogging and conveying. The spray device may be located in the system where it is most beneficial but as shown in FIGURE 1, it is mounted on the exhauster 13.

When the electric eye 55 is operated by interrupting the light beam, an electric signal carried by a conductor within a conduit 111' to open relay contact 55A, or if switch 239 is opened, the feed conveyor 11 cannot be operated forwardly. Contacts 55B, 55D and 55E of the electric eye relay 55 may be used to operate accessory equipment, including the remote signal 76.

When the switch 226 is manually moved from an "off" position 246 to an "on" position 247, current will flow through contact 53A of the electric eye relay 53, an indicator light 248, conductor 216, and from the switch to the downstream side of contact 249A of relay 249, solenoid 113 on the hydraulic valve 106 and conductor 216. This causes the valve to shift and allow hydraulic fluid to flow to the cap end of cylinder 117 to cause the ram to advance as desired when hydraulic pump 101 is operating.

When the switch 226 is turned from the "off" position 246 to an "automatic" position 250, current will flow through indicating light 251, conductor 216, and also through contact 228A of relay 228, contact 252A of a switch 252, contact 249B of relay 249, solenoid 143 of the valve 106 to shift its spool and thereby allow hydraulic fluid to flow to the rod side of cylinder 117 to always forcibly return the ram, providing the pump 101 is operating. Therefore, whenever switch 226 is in any position but the automatic position 250 and said switch is turned to this position, the ram of hydraulic cylinder 117 will always retract.

In view of the foregoing, and assuming that the hydraulic pump is in operation and the switch 226 is in the automatic position 250, the ram will continue to retract and as it comes to a stop the switch 252 is actuated opening contact 252A to interrupt the flow of current to the solenoid 143 on valve 106, thereby preventing further fluid flow to cylinder 117.

When the electric eye 53 is operated by interrupting the light beam after a given time delay, current flows from the switch 226 through the electric eye contact 252B of contact 53B, switch 252, contact 77A of a switch PB 77, to a coil 249C of actuating relay 249. A sealing circuit, created when the coil 249C of relay 249 is actuated, allows current to flow through switch 226, switch 142, contact 249D of relay 249, contact 254A of relay 254 to the coil of 249C and conductor 216. This sealing circuit assures continuance of ram stroke to its entirety even if the eye 53 becomes deenergized during the forward stroke of the ram. Upon completion of the forward stroke, current flows from switch 226 through contact 228A of relay 228, contact 252A of switch 252, contact 249B of relay 249, energizing the solenoid 143 on the valve 106, shifting the valve allowing hydraulic fluid to flow to the rod end of cylinder 117, thereby returning the ram. When the ram advances to a predetermined distance in the baling chamber 18, the switch 142 is actuated, breaking a contact therein, the sealing circuit described above is broken, which causes the coil of relay 249 to deenergize, thus opening the circuit between switch 226 and solenoid 113 to actuate valve 106 and momentarily stop hydraulic fluid flow to cylinder 117. At the same time, the solenoid 143 of the valve 106 is energized, current will flow through the switch 226, contact 228A of relay 228, contact 252A of switch 252, contact 249B of relay 249, solenoid 143, and conductor 216. When the solenoid 143 is energized, the valve 106 shifts, allowing hydraulic fluid flow to be directed to the rod end of cylinder 117, thereby retracting the ram 16.

When the ram advances the bale in the second or elongate bale chamber 19 of the baler, the switch 67 of the device 22 is operated, causing current flow from counter 68 to switch 67 and electric pulsations, created by the making and breaking of contacts in this switch, are recorded by the counter 68. When the predetermined bale length has been reached, as determined by the counter 68, the ram regardless of its position will advance toward the predetermined fixed position 69, whereupon current flows from switch 226 through switch 142 to the counter 68, whose contacts have been closed when the counter is counted out, coil 228C of relay 228, and conductor 216. When the coil 228C of relay 228 is energized, current will flow through contact of relay 228 including contact 249D of relay 249, contact 254A of relay 254, coil 249C of relay 249, to establish a sealing circuit allowing current to by-pass switch 142. As the ram reaches its full stroke forward to the position 69, the switch 73 is actuated, closing its contacts, whereupon current will flow from switch 226 through contact 228B of relay 228, switch 73, and coil 254C of relay 254 and conductor 216, energizing relay 254 to actuate contact 254A to interrupt the current flow to coil 249C of relay 249, opening the contact 249A of relay 249 and deenergizing the solenoid 113 of the valve 106 to shift this valve and thereby stop fluid flow to cylinder 117 and prevent ram movement. Simultaneously, another set of contacts 254D in the relay 254 close allowing current flow from switch 73 through contact 254D of relay 254 to signals 74, 75 and 76 and conductor 216. With the ram in this forward fixed position, the bale can be tied in a conventional manner.

To return the ram 16 to automatic operation, the switch 77 is manually actuated closing contact 77C and opening control contacts 77A and 77D to seal the circuit and cause current to flow from this switch through contact 254B of relay 254 to counter 68, energizing and resetting its mechanism for remeasuring the next bale; also interrupting current flow to the coil 228C of relay 228, re-establishing the normal reversing circuit. The current flows from the switch 77 through contact 77B to a relay 255, solenoid 143 of the valve 106, conductor 216, shifting the valve to allow fluid flow to the rod end of the cylinder 117 causing the ram to reverse its movement. As the ram reverses, the switch 73 deenergizes the coil 254C of relay 254 to cause the contacts 254D of relay 254 to return to a normally open position and deenergizes signals 74, 75 and 76.

The material receiving units 6 are electrically controlled and pneumatically operated. One or more of such units on one or more sub-systems are electrically connected for fail-safe automatic control by the electric eye 55 and/or relay 228, the latter of which is controlled by counter 68. The material receiving units are also so connected electrically that when two or more units are attached to the same material handling unit only one receiving unit can be operated at any given time. The switches 96 and 97 which are mounted on each of the units are operatively connected with one another, including the electric eye 55 and the counter 68 through its control of the relay 228. As evidenced in FIGURE 1, two pairs of units 6 are respectively connected to the collectors through conduits 9.

In this hookup the transformer 215 is operatively connected to the electrical means for actuating the valves of the mechanisms 10 in the units 6, through conductor 217, to contact 228D of relay 228 and contacts 55E and 55B of the electric eye relay 55 to all of the switches 96 in all sub-systems and making current available to operate opening solenoids 256 and 258 of one sub-system and 260 and 262 of another sub-system respectively associated with the air cylinder at such units. Through contacts 55B the electric eye relay 55 is operatively connected to all of the limit switches 95 in all sub-systems through contacts of the latter and conductors 264 connected to conductor 216. The signals 98 are respectively interposed in the conductors 264 in a manner whereby the signals when energized in any one of the sub-systems indicate that this sub-system and the other sub-systems are available for service to receive material for induction to the collector 3. The control switches 96 in the units of each sub-system shown function independently of one another. The arrangement is such that when the switch 96 in one of the units of one sub-system is actuated current will flow from contacts 55B of the electric eye relay 55 through switch 95 of the unit, switch 95 of the other unit, successively through switches 97, 96, and 95' of said one unit, solenoid 256 to conductor 216, whereupon an air cylinder valve causes the piston 89 and valve 90 to retract to the fixed position shown in FIGURE 3. When the abutment 92' of the valve 90 engages the limit switch 95 of said one unit during such retraction, the circuit to the signals 98 in this unit and the other unit in said one sub-system are rendered inoperative. To close the valve at said one unit of said one sub-system, the switch 97 of said one unit is actuated causing current flow through limit switch 95, solenoid 257, and conductor 216. Such closing effects operation of the air valve causing the piston and valve 90 to move toward a closing position in a passage defined by the casing of said one unit, and when the valve is extended forwardly the abutment 92 will engage the limit switch 95' and thereby reactivate the signal circuit to operate the signal 98 in the units of said one sub-system.

If a valve 90 is in the open position and the beam of the electric eye 55 is broken, the flow of current to the switches 96 in all of the sub-systems is interrupted by the simultaneous opening of contact 55B of relay 55 and closing of contact 55E. Also when the counter has counted out, the contact 228D of relay 228 closes, allowing the current to flow thorugh switches 95', and selectively through the solenoids 257 or 259 of one of the sub-systems and 261 or 263 of another sub-system and conductor 216. This circuitry automatically closes any open valve in the sub-systems and locks them in such position. The organization is such that the baler is provided with means for controlling the flow of material to the baler.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A machine comprising a frame provided with a chamber for receiving material to be compressed, means for compressing the material forwardly in the chamber to form a compact mass, means for actuating said compressing means within a predetermined range of operation, means for automatically controlling said actuating means, means associated with said chamber for determining a condition of the mass, and means operatively connecting said determining means with said controlling means for causing movement of said compressing means to a position forwardly of said predetermined range when the mass has attained said condition and arresting its movement in said forward position.

2. The machine defined in claim 1, including a sensory signal associated with said chamber and operatively connected to said determining means.

3. The machine defined in claim 1, including means operatively associated with said compressing means and said actuating means whereby the operating range and the forward position of said compressing means may be varied.

4. A machine comprising a frame provided with an elongate chamber for receiving material to be compressed, means movable in a forward direction for moving and compressing the material in the chamber to gradually form a mass and also being movable in a rearward direction, means for operating said movable means, means for controlling said operating means for operating said movable means within a predetermined range of movement, means for measuring the size of the mass desired, and means operatively connecting the measuring means with said controlling means for locating said movable means in a fixed position forwardly of said predetermined range when the desired size of the mass has been formed.

5. A machine of the kind described comprising a chamber, means for conducting to the chamber a material to be compressed, means for compressing the material into a mass, and means for determining a condition of the mass in the chamber operatively connected to said conducting means for controlling the flow of material therethrough.

6. The machine defined in claim 5, including a plurality of conducting means, with means for selectively operating the same, the operation of said last mentioned means being dependent on the condition of said determining means.

7. The machine defined in claim 5, in which the means for conducting the material to the chamber for compression comprises a tubular duct and means for effecting movement of the material therethrough.

8. A baler comprising a frame provided with an elongated chamber having an opening at one end thereof, tubular means connected to said opening, means for conducting material through said tubular means to said chamber via said opening, a ram, means for applying forces to said ram to compress into a compact mass material which is fed to said chamber, means for determining when the compacted mass attains a predetermined condition, and means operatively connecting said conducting means and said determining means whereby the latter serves to render said conducting means inoperative when the mass attains said condition.

9. The baler defined in claim 8, in which said connecting means is also connected to said applying means for rendering the ram substantially inoperative after the mass attains said condition.

10. A baler comprising a frame provided with an elongate chamber having an opening at one end thereof through which material can be introduced to the chamber and also having an outlet, a ram movable from a retracted position for compressing the material forwardly in the chamber, means for effecting rapid successive forward strokes to said ram during at least a portion of its travel in a continuous forward direction to compress the introduced material into a compact mass, means for determining when the compacted mass has attained a predetermined size, and means operatively connecting said determining means and said effecting means whereby the latter is rendered ineffective to operate said ram in a retracting direction when the size of the mass has been established by said determining means.

11. The baler defined in claim 10, including means for feeding material through said opening, and in which said feeding means is also connected to said operatively connecting means whereby said feeding means is rendered inoperative when the mass attains the predetermined size.

12. A machine comprising a frame provided with an elongate chamber having an opening at one end thereof through which material can be inserted into the chamber, a ram, means for applying power to said ram for forcing it forwardly in said chamber for compressing the material, means for determining the density of the material while it is being compressed, means operatively connecting said determining means and said power applying means for controlling the amount of power applied to said ram to impart rapid strokes thereto during its travel within a predetermined distance in one direction, means for indicating when the mass has attained a predetermined size, and means operatively connecting said indicating means and said power applying means for automatically rendering the latter inoperative when the mass is moved beyond said predetermined distance.

13. The baler defined in claim 12, including sensory signal means, and means for operating said signal means when the mass attains a predetermined size.

14. A machine comprising a frame provided with an elongate chamber having an opening at one end thereof through which material is adapted to be introduced, a ram, means for applying forces to said ram for directing it forwardly within a predetermined range to compress into a compact mass material which is introduced to said chamber, means for determining when the mass attains a predetermined size, and means operatively connecting said applying means and said determining means for locating said ram in a position forwardly of said predetermined range.

15. The machine defined in claim 14, including means for determining the density of the mass, and means responsive to said density means for controlling said applying means whereby to increase the forces applied to said ram during at least a portion of its travel in said range as the density of the mass increases.

References Cited by the Applicant
UNITED STATES PATENTS

| | | |
|---|---|---|
| 1,020,838 | 3/12 | Neer. |
| 2,221,741 | 11/40 | Vogel-Jorgensen. |
| 2,413,479 | 12/46 | Wiegand. |
| 2,673,126 | 3/54 | Mathews. |
| 3,025,785 | 3/62 | Deems. |
| 3,111,892 | 11/63 | Deems. |

References Cited by the Examiner
UNITED STATES PATENTS

| | | | |
|---|---|---|---|
| 405,270 | 6/89 | Paty et al. | 100—191 X |
| 949,767 | 2/10 | House | 100—45 X |
| 1,100,592 | 6/14 | Madden. | |
| 2,938,451 | 5/60 | Seltzer | 100—4 |
| 3,089,410 | 5/63 | Stangl | 100—215 |

CHARLES A. WILLMUTH, *Primary Examiner.*

WALTER A. SCHEEL, *Examiner.*